(12) United States Patent
Chien

(10) Patent No.: US 6,177,377 B1
(45) Date of Patent: Jan. 23, 2001

(54) POLYMER BLENDS AND PROCESS FOR PREPARATION

(75) Inventor: James C. W. Chien, Amherst, MA (US)

(73) Assignee: Amherst Polymer Technology, Inc., Amherst, MA (US)

( * ) Notice: Under 35 U.S.C. 154(b), the term of this patent shall be extended for 0 days.

(21) Appl. No.: 08/768,664

(22) Filed: Dec. 18, 1996

(51) Int. Cl.⁷ .................................................. B01J 20/34
(52) U.S. Cl. .................... 502/113; 502/114; 502/115; 502/116; 502/117; 526/117; 526/127; 526/160; 526/170; 556/53
(58) Field of Search ..................... 502/113–117; 556/53; 526/117, 127, 160, 170

(56) References Cited

U.S. PATENT DOCUMENTS

| | | | | |
|---|---|---|---|---|
| 4,530,914 | * | 7/1985 | Ewen et al. ........................... | 502/113 |
| 4,935,474 | * | 6/1990 | Ewen et al. ........................... | 526/114 |
| 4,937,299 | * | 6/1990 | Ewen et al. ........................... | 526/119 |
| 5,036,034 | * | 7/1991 | Ewen .................................... | 502/117 |
| 5,292,838 | * | 3/1994 | Ravazi .................................. | 526/160 |
| 5,359,102 | * | 10/1994 | Inoue et al. ........................... | 556/53 |
| 5,401,817 | * | 3/1995 | Palackal et al. ...................... | 526/127 |
| 5,468,781 | * | 11/1995 | Sugane et al. ........................ | 521/60 |
| 5,585,448 | * | 12/1996 | Resconi et al. ...................... | 526/170 |

\* cited by examiner

*Primary Examiner*—Edward J. Cain
(74) *Attorney, Agent, or Firm*—Rines and Rines

(57) ABSTRACT

This invention relates to polymer blends and the process for preparing naturally compatibilized polyolefin blends using a "one-pot" polymerization of a single monomer, whereby two homopolymers having different structures are produced as well as a third block copolymer having alternating sequences of the two structural segments of the two homopolymers. The formation of the block copolymer is established by solvent extraction and $^{13}$C-NMR spectroscopy. The catalyst compositions enabling the direct synthesis of naturally compatibilized polymer blend is prepared by combining four components. The first two components are organometallic complexes of Group IVB or VIIIB elements. The third component is a cocatalyst which irreversibly reacts with at least one ligand on the transition metal complexes. The fourth component is a hydrocarbyl or oxyhydrocarbyl compound of Group IIIA metals, which functions as a cross-over agent.

10 Claims, 10 Drawing Sheets

POLYMER BLENDS AND PROCESS FOR PREPARATION

TECHNICAL FIELD OF THE INVENTION

This invention relates to the preparation of blended polyolefins using certain catalyst compositions. More particularly, this invention relates to the use of catalyst compositions comprising ionic organometallic compounds, cation forming cocatalysts, and cross-over agents, to polymerize olefins into compatible blends of polyolefins of different microtactic structures, to polymerize olefins into compatible blends of polyolefins of dissimilar isomeric and copolymer structures, and to polymerize styrene into compatible blends of polystyrenes of different microtactic structures.

BACKGROUND OF THE INVENTION

Normally, two different polymers because of the very low entropy of mixing. Sometimes, however, two different polymers can form a compatible blend with the aid of an agent. The agent can be a block copolymer of two homopolymers. One of the problems associated with the prior art agents and methods of blending is that it is not a simple task to find such an agent, to devise a commercially viable synthetic method for its preparation and to subsequently blend the components into an homogeneous material without macrophase separation. In many instances, polymer blends have useful properties which are either superior or not possessed by the constituent homopolymers. For example, many members of the family of premium materials called engineering resins, are compatibilized polymer blends.

Different polyolefins assembled from the same monomer molecules having different geometrical, chemical, or stereochemical isomeric structures are generally immiscible. A well known example is low density polyethylene manufactured at high pressure and high density polyethylene manufactured at low pressure. Other prior art examples include the products of Ziegler-Natta catalyzed propylene polymerization which include high molecular weight isotactic-crystalline polypropylene and low molecular weight amorphous polypropylene. The two polymers are immiscible and the amorphous polymer must be removed or its presence renders the crystalline polymer physically and mechanically too weak to be of any commercial value.

Well-defined organometallic compounds, such as Group IVB elements, of the Periodic Table (Handbook of Chemistry and Physics, 49th Edition, Ed. R. C. Weast, Chemical Rubber Co. Cleveland, 1968) have been found to possess stereoselectivity in the polymerization of propylene, styrene, and other α-olefins depending upon the ligand structure of the organometallic precursor.

For example, in one prior art method, chiral group IVB metallocene precursors act as catalysts for the isospecific polymerization of propylene to yield isotactic polypropylene, (See U.S. Pat. No. 4,794,096 and the articles by Kaminsky et al. *Angew. Chem. Int. Ed. Engl.* 1985,24, 307 and by Ewen in *J. Am. Chem. Soc.* 1984, 106, 6355).

In addition, Ewen et al. as disclosed in *J. Am. Chem. Soc.* 1988, 110, 6255 and U.S. Pat. No. 4,892,851 taught that zirconocene precursors having bilateral symmetry could produce syndiotactic polypropylene and are capable of polymerizing ethylene, α-olefins and cycloolefins with comparable activity.

Organometallic compounds having $C_{2v}$ symmetry, whether as a stereorigid zirconocene or a free rotating complex as disclosed by Chien et al., *Macromolecules* 1995, 28, 5399, tend to catalyze propylene polymerization without profacial selectivity. Similar nonspecific polymerizations of propylene have previously been catalyzed by titanium complexes with either a single $\eta^5$ ligand or a phenolic ligand.

In the case of styrene, syndioselective polymerizations have been achieved using either mono $\eta^5$-ligands as disclosed by Ishihara et al in *Macromolecules* 1986, 19, 2464, or 2,2'-thiobis(6-t-butyl-4-methylphenoxy) ligands as disclosed by Miytake et al. in *Makromol Chem. Macromol. Symp.* 1993, 66, 203. Other prior methods have included the use of zirconocene dichloride and hafnocene dichloride as catalysts in the production of atactic polystyrenes.

All the above precursors and other conventional precursors have been used to provide for the linear polymerization of ethylene.

Brookhart et al. disclosed in *J. Am. Chem. Soc.* 1995, 117, 6414 that during the polymerization of ethylene in the presence of a 1.4-diaza-1,3-butadien-2-y nickel complex and a cocatalyst, branched polyethylene are produced.

All of the above precursor are activated by a cocatalyst which transforms the former catalyst into the corresponding cationic species (See U.S. Pat. No. 5,198,401 and EP 573, 403). The cocatalyst comprises a cation which irreversibly reacts with at least one ligand from either the Group IVB or VIIIB metal complexes to form the catalytically active cationic Group IVB or VIIIB complex. The counter anion is non-coordinating, readily displaced by a monomer or solvent, has a negative charge delocalized over the framework on the anion or within the core thereof, is not a reducing or oxidizing agent, forms stable salts with reducible Lewis acids and protonated Lewis bases, and is a poor nucleophile.

Other prior types of cocatalyst include Lewis acids which will irreversibly react with at least one ligand from a Group IVB metal complex to form an anion possessing many but not all of the characteristics described above (See Marks et al. *J. Am. Chem. Soc.* 1991, 113, 3623).

High molecular weight polypropylene having a certain steric structure, prepared individually in the presence of one of the prior art catalysts described above, is generally immiscible with another polypropylene of a different steric structure. For example, a solvent-casted blend of any pair of stereoisomeric polypropylenes, e.g., isotactic and atactic, etc., tend to crumble easily and the tensile bar press molded from the blend fails with the least bit of strain. Likewise linear polyethylenes and branched polyethylenes are immiscible as are mixtures of linear polypropylene and branched polypropylenes. Syndiotactic polystyrenes are typically incompatible with atactic polystyrenes.

In another prior process, solutions of two different metallocenes are used to polymerize monomers separately as if each is unaffected by the presence of the other. This method is useful for preparing polyethylenes with bimodal molecular weight distribution using two group IVB metallocenes as disclosed by Ewen, *Studies in Surface Science and Catalysis* Vol 25 *Catalytic Polymerization of Olefins* Eds. Keii et al., Kodansha, Elsevier, 1986, pp.271, and by Ahlers and Kaminsky, *Makromol. Chem.; Rapid Commun.* 1988,9, 457. A polypropylene having multimodal molecular weight distribution was obtained using an ansa-hafliocene and ansa-zirconocene mixture to produce isotactic polypropylenes albeit having molar masses that are different.

Despite all of the prior processes for preparing various polymers, there are no processes that are capable of forming compatibilized polyolefin blends of the present invention.

Unlike the prior art, the present invention allows one to synthesize, directly in a "one-pot" polymerization of a single monomer, useful blends of polyolefins having different steric structures and/or geometric structures without the need for subsequent blending of the polyolefins.

Thus, one object of the invention is to provide an olefin polymerization catalyst which can give olefin polymers of different structures $A_n$ and $B_m$ as well as a third substance having blocks of the same structures $(A_n{}^1 B_m{}^2)_x$ in its chain, the latter is capable of bridging $A_n$ and $B_m$ thus compatibilizing the two isomeric homopolymers. For example, in one preferred embodiment, $A_n$, is an isotactic polypropylene and $B_m$ is an atactic polypropylene having the microstructures shown in the following conventional projection:

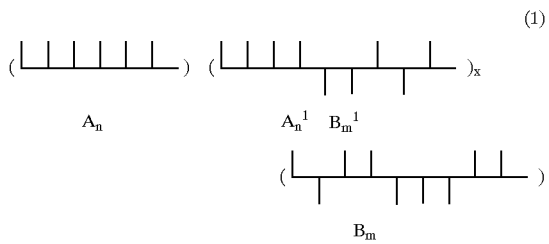

(1)

The subscripts $^n$ and $^m$ indicate that the number of monomeric units in the homopolymers which are large integers (10 to 30,000); the subscripts $_n{}^1$ and $_m{}^1$ indicate the number of monomeric units in the block copolymers which are smaller integers (10 to 1,000), and x ranging from 10 to 100 denotes the number of AB blocks.

Another object of this invention is to provide a catalyst composition for the "one-pot" direct synthesis of materials as disclosed in projection 1 wherein $A_n$ and $B_m$ can also be syndiotactic polypropylene, and hemiisotactic polypropylene. For any combination, $A_n$ and $B_m$ will always have different microstructures.

Another object of this invention is to provide a catalyst composition for the "one-pot" direct synthesis of the materials of projection 1 wherein $A_n$ is linear polyethylene and $B_m$ is branched polyethylene.

Another object of this invention is to provide a catalyst composition for the "one-pot" direct synthesis of materials of projection 1 wherein $A_n$ is ethylene- α-olefin copolymer (commonly referred to as liner low density polyethylene) and $B_m$ is a linear ethylene homopolymer (polyethylene).

Another object of this invention is to provide novel polymer blends from two different monomers.

Another object of this invention is to provide a catalyst composition for the "one-pot" direct synthesis of materials as shown in projection 1 wherein $A_n$ is a linear polypropylene having either an isotactic, syndiotactic or atactic microstructure and $B_m$ is a branched polypropylene.

Another object of this invention is to provide a catalyst composition for the "one pot" direct synthesis of the materials of projection 1 wherein $A_n$ is syndiotactic polystyrene and $B_m$ is atactic polystyrene.

Another object of this invention is to provide novel polymer blends from a single monomer exhibiting properties of plastics with a wide range of stiffness, hardness, impact strength, and abrasion resistance.

Another object of this invention is to provide novel polymer blends from a single monomer exhibiting properties of elastomers with 0 range of modulus, elasticity and cross link density of physical nature.

Another object of this invention is to provide novel low molecular weight polyolefin mixtures from a single monomer exhibiting properties suited for lubricant and motor oil applications.

Another object of this invention is to provide novel materials from a single monomer exhibiting properties characteristic of a plastomer.

Another object of this invention is to provide novel polymer blends from a single monomer exhibiting properties characteristic of a flexomer.

Another object of this invention is to provide novel polymer blends from a single monomer exhibiting properties characteristic of a thermoplastic elastomer.

Another object of this invention is to provide novel polymer blends from a simple monomer exhibiting properties characteristic of an elastomer.

Another object of this invention is to provide novel blend exhibiting unusual properties and having the characteristics of a tough plastomer, thermoplastic elastomer, gum rubbers and lubricating fluid, wherein all these materials are processed like thermoplastics.

A name is lacking for the novel materials of the present invention. The properties of the material suggest the following terms: interfacial polymer blends, interpenetrating polymer blends, naturally compatibilized polymer blends, or simply compatible polymer blends. These terms are used herein interchangeably but do not exclude other more suitable names.

SUMMARY OF THE INVENTION

The present invention relates to metallocene catalyst compositions which are designed to provide chemical and/or stereochemical control during the polymerization of polyolefins including ethylene, propylene higher α-olefins and/ or styrene. The present invention provides a novel crossover agent that promotes the interchange of propagating chains of one type of catalytic site to another, thus providing for the formation of materials capable of bridging or compatibilizing two different homopolymers so that a "naturally" compatible blend is produced directly.

The present invention also provides for several classes of polymerization catalysts.

A first class of olefin polymerization catalyst of the present invention is formed from a chiral stereorigid metallocene (iso-P) and cocatalyst that is capable of the isospecific polymerizing of propylene into an isotactic structure.

A second class of olefin polymerization catalyst of the present invention is formed from a bilaterally symmetric stereorigid metallocene (syn-P) and a cocatalyst capable of the syndiospecific polymerizing of propylene into a syndiotactic structure.

A third class of olefin polymerization catalyst of the present invention is formed from a $C_2$, symmetric stereorigid or nonrigid metallocene (ata-P) and a cocatalyst capable of the nonspecific polymerizing of propylene into an atactic structure.

A fourth class of olefin polymerization catalyst of the present invention is formed from an asymmetric stereorigid metallocene (hemi-P) and a cocatalyst capable of the polymerizing of propylene into a hemiisotactic structure.

A fifth class of olefin polymerization catalyst of the present invention is formed from a single cyclopentadienyl metal compound (syn-S) and a cocatalyst capable of the polymerizing of styrene into a syndiotactic structure.

A sixth class of olefin polymerization catalyst of the present invention is formed from a cyclopentadienyl zirconium or hafnium compound (ata-S) and cocatalyst capable of polymerizing styrene into an atactic structure.

A seventh class of olefin polymerization catalyst of the present invention is formed from a 1,4-diaza-1,3-butadien- 2-yl complex of group VIIIB metal (BR) and a cocatalyst capable of the polymerizing of ethylene into a branched polyethylene and propylene into branched polypropylene.

The present invention provides a cross-over agent to promote the interchange of the propagating chain on one olefin polymerization catalyst with another propagating chain on a second different olefin polymerization catalyst.

The present invention also provides a first process for the polymerization of olefins having its characteristic feature in that propylene is polymerized or block copolymerized in the presence of a catalyst precursor selected from the iso-P, syn-P, ata-P, hemi-P classes and a second precursor selected also from these four classes but which is not the same as the former, with a common cocatalyst and cross-over agent.

The present invention provides a second process for the polymerization of ethylene having characteristic features in that ethylene is polymerized or block copolymerized in the presence of a catalyst of the BR class and another precursor selected from metallocene or monocyclopentadienyl metal complexes, with a common cocatalyst and cross-over agent.

The present invention provides a third process for the polymerization of propylene having a characteristic feature in that propylene is polymerized or block copolymerized in the presence of a catalyst of the BR class and another precursor selected from the iso-P, syn-P, ata-P and hemi-P classes, with a common cocatalyst and cross-over agent.

The present invention provides a fourth process for the polymerization of styrene having a characteristic feature in that styrene is polymerized or copolymerized in the presence of a catalyst of the syn-S class and another precursor selected from the ata-S class, with a common cocatalyst and cross-over agent.

The present invention also relates to the products offered by the novel process including compatible blends of pairs of stereoisomeric polypropylenes: isotactic and atactic, syndiotactic and atactic, syndiotactic and isotactic, hemiisotactic and atactic, hemiisotactic and isotactic, hemiisotactic and syndiotactic; compatible blends of syndiotactic polystyrene and atactic polystyrene; compatible blends of linear polyethylene and branched polyethylene; and compatible blends of branched polypropylene and linear stereoisomeric polypropylene.

Finally, the present invention provides for the types of products in varying ratios of the constituent polymers that exhibit a range of physical, thermal, mechanical, morphological, viscoelastic and elastomeric properties.

BRIEF DESCRIPTION OF THE DRAWINGS

For a better understanding of the invention, its objects, features and advantages, there follows a Detailed Description of the invention which should be read in conjunction with the following figures in which.

DETAILED DESCRIPTION OF THE INVENTION

Figure 1:
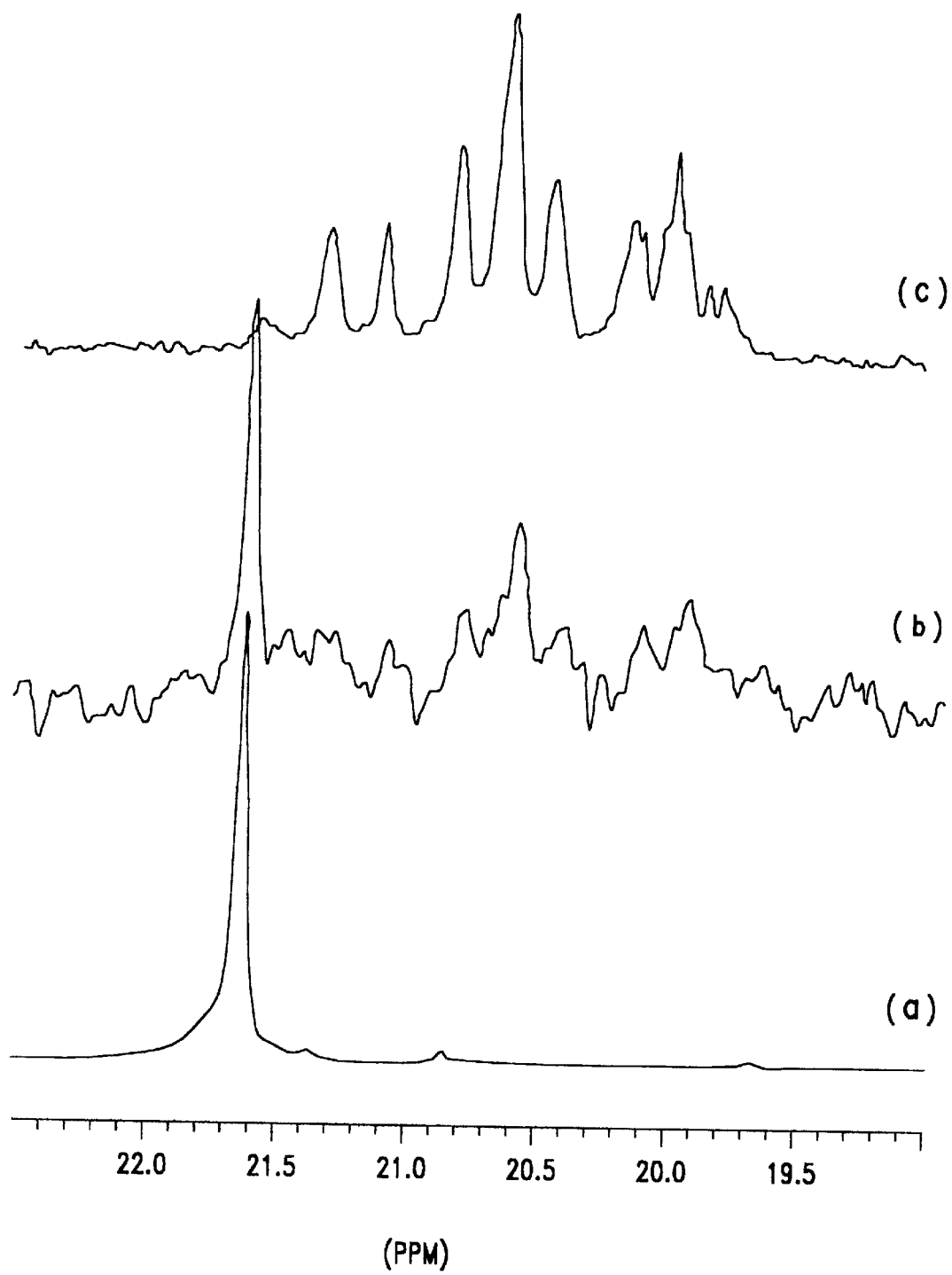
FIG. 1 illustrates a room temperature $^{13}$C NMR spectra in the methyl region of polypropylene as found in Example 1 of the present invention including (a) the heptane insoluble isotactic fraction; (b) the heptane soluble but hexane insoluble stereoblock fraction; and (c) the diethylether soluble atactic fraction.

The compounds used herein are referred to by names of common usage rather than the scientifically correct names for the sake of brevity. The bis(cyclopentadienyl) group IVB metal compounds may be referred to as "metallocene" embracing all other $\eta^5$-rings such as indenyl, tetrahydroindenyl, fluorenyl, octahydrofluorenyl, benz[e]indenyl, benz[f]indenyl and their derivatives with substituents. The metal compound may have two identical "cyclopentadienyls" or two dissimilar $\eta^5$-rings. Cp, Ind and Flu are used to denote respectively, the cyclopentadienyl, indenyl, and fluorenyl radicals. In addition, a "metallocene" wherein the metal is titanium may be referred to as a "titanocene"; where the metal is zirconium as a "zirconocene"; where the metal hafnium as a "hafnocene". Other group IVB organometallic compounds having only one or none of the Cp type ligands will be referred to as metallocenes.

Preferably, the olefin polymerization catalysts of the present invention are prepared from two or more metallocene precursors and a cocatalyst, the exception being the branch rearrangement polymerization catalyst precursor of the BR class. Preferably, the metallocene precursors of the present invention are complexes of group IVB elements including Ti, Zr and Hf, having one or more pentahaptoligands including, for example, Cp (cyclopentadienyl), Ind (indenyl) and Flu (fluorenyl) having strategically placed hydrocarbyl groups of one (1) to forty (40) carbon atoms.

In the case of two pentahapto-ligands they may be bridged by 3, 2, 1 or 0 atoms selected from the group IIIA, IVA, VA, and VIA of the Periodic Table. The number and type of bridging atoms are determined by the stereorigidity and accessability desired of the metallocene. One pentahapto-ligand complex may contain a bridge connecting it to a norhapto-group having a heteroatom selected from the group IIIA, IVA, VA or VIA suitable for covalent or dative bonding to the group IVB metal center. The remaining nonhapto-ligands are selected from groups of hydrocarbyls having 1 to 20 carbon atoms, alkoxyl groups having 3 to 30 carbon atoms, or the group VIIA atoms.

The olefin polymerization cocatalysts preferably are Bronsted or Lewis acids and nucleophilic cations. Other possible cocatalysts are hydrocarbyl or oxyhydrocarbyl compounds from the group IA to VA elements. These cocatalysts function by oxidation of an anionic non-hapto-ligand from the metallocene precursor to generate the catalytic active corresponding metallocenium species.

The olefin polymerization catalytic composition of the present invention provides a cross-over agent from one of the following: metal hydrocarbyls, metal halocarbyls, metal oxyhydrocarbyls, or metal oxyhalocarbyls of the Groups IIB and IIIA. The counter-anion formed by the cocatalysts of the present invention is bulky, inert and compatible with and noncoordinating toward the Group IVB metal cation formed from the metallocene precursor.

In the present invention, the stereochemical specificity of a metallocene catalyst during the polymerization of propylene is mainly determined by its molecular structure. In the preferred embodiment of the present invention, there are four classes of metallocene catalysts, each of which promotes a different stereoregulated propylene insertion process as follows: (1) iso-P is a racemic metallocene of $C_2$ symmetry which catalyzes isotactic enchainment, (2) syn-P is an achiral bilaterally symmetric metallocene of $C_s$ symmetry which produces syndiotactic enchainment, (3) ata-P is an achiral symmetric metallocene of $C_{2v}$ symmetry which favors atactic enchainment, and (4) hemi-P is a chiral asymmetric metallocene of $C_i$ symmetry which favors hemi-isotactic enchainment.

Examples of iso-P metallocenes which may be used in the preparation of an isospecific propylene polymerization catalyst are as follows: rac-ethylenebis(1- $\eta^5$-indenyl) dichlorozirconium (Cat. 2), rac-ethylenebis(1- $\eta^5$-indenyl)-dimethylzirconium, rac-ethylenebis(1- $\eta^5$-4,5,6,7-tetrahydro-indenyl)dichlorozirconium, rac-ethylenebis(1- $\eta^5$-4,5,6,7-tetrahydroindenyl)dimethylzirconium, rac-dimethylsilyienebis(1- $\eta^5$indenyl)dichlorozirconium (Cat. 1), rac-dimethylsilyienebis(1- $\eta^5$- -indenyl) dimethylzirconium, rac-ethylenebis(1- $\eta^5$-benz[e]indenyl) dichlorozirconium, rac-dimethylsilylenebis(1- $\eta^5$-2-methyl-benz[e]indenyl)dichlorozirconium and rac-dimethylsilylenebis (2-methyl-4-napththyl(1- $\eta^5$-indenyl) dichlorozirconium. The above metallocenes are arranged in the order of increasing stereoselectivity and decreasing chain termination. Therefore, in the preferred embodiment, the appropriate metallocene to produce isotactic polypropylene or other poly- α-olefin having the desired stereoregularity, melting transition temperature and molecular weight may be selected.

Examples of ata-P metallocenes which may be used in the preparation of the nonspecific propylene polymerization catalyst are as follows: bis-( $\eta^5$-cyclopentadienyl) dichlorozirconium, bis-( $\eta^5$-cyclopentadienyl) dimethylzirconium, ethylenebis(9$\eta^5$-fluorenyl) dichlorozirconium (Cat.3) and dimethylsilylene, bis-(9$\eta^5$-fluorenyl) dichlorozirconium. The above metallocenes are arranged to produce atactic polypropylene in the order of increasing activity and molecular weight.

Examples of syn-P metallocenes which may be used in the preparation of a syndiospecific propylene polymerization catalyst are as follows: isopropylidene(1- $\eta^5$-cyclopentadienyl)(9- $\eta^5$-fluorenyl)dichlorozirconium (4), isopropylidene-(1- $\eta^5$-cyclopentadienyl)(9- $\eta^5$-fluorenyl)dimethylzirconium, t -butylmethylidene(1- $^5$-cyclopen tadienyl)(9-i$^5$-fluorenyl)dichloro-zirconium and diphenylmethylidene(1- $\eta^5$-cyclopentadienyl)(9- $\eta^5$-fluorenyl)dichlorozirconium (Cat. 5). The above metallocenes are arranged in the order of increasing syndioselectivity and decreasing chain termination. Therefore, in the preferred embodiment, the appropriate metallocene to produce syndiotactic polypropylene having the desired properties may be selected.

In general, non-bridged zirconocene polymerize propylene with the lowest activity to lowest molecular weight product as pointed out by Kaminsky (in *History of Polyolefins*, Ed. Seymour et al., Reidel Publishing Co. 1986, pp.257–270), whereas the stereorigid $C_{2v}$ compounds exhibit exceedingly high activity and produce a-PP having molecular weight of between half and one million.

Other aspecific propylene polymerization catalysts may be used which do not have the metallocene framework including dimethylsilylene(1- $\eta^5$-2,3,4,5-tetra-methy-cyclopentadienyl) (t-butylamido) dichlorotitanium, 2,2'-thiobis(6-t-butyl-4-methylphenoxy)dichlorotitanium and monocyclopen tadienyl or nonoindenyl compounds of the formula LTiX$_3$, where L=Cp or Ind, X=Cl, Me, OiPr, and also attached to the $\eta^5$ring is a substituent containing an electron donating heteroatom selected from group VA elements.

Examples of hemi-P metallocenes which may be used in the preparation of a hemiisospecific propylene polymerization catalyst are as follows: rac-isopropylidene(l- $\eta^5$-3-methylcyclopentadienyl)(9- $\eta^5$-fluorenyl) dichlorozirconium, rac-isopropylidene(1- $\eta^5$-cyclopentadienyl)(l- $\eta^5$-indenyl)dichlorozirconium, and rac-isopropylidene(l- $\eta^5$-cyclopentadienyl)(l- $\eta^5$-3-methylindenyl)dichlorozirconium.

Examples of syn-S precursors which may be used in the preparation of a syndiospecific styrene polymerization catalyst are monopentahapto compounds of the formula LTiX$_3$ (Cat. 6 where L=Cp, Ind, or benz[e]indenyl with substituents selected from groups of hydrocarbyls having 1 to 20 carbon atoms and X=C$_2$, Me, OiPr, benzyl. The lower valent analogs LTiX$_2$ are also active syn-S precursors.

Examples of ata-S precursors which may be used in the preparation of an aspecific polymerization catalyst to produce amorphous polystyrene are zirconium compounds L'$_n$ZrX$_{4-n}$, where L'=CP, $\eta$-Me$_5$C$_5$, n=1,2 and X=Cl, Me, O-i-Pr, benzyl.

In the present invention, ethylene is polymerized which is accompanied by rearrangement to form branched polyethylene having from a few to several hundred per 1,000 carbons, the branches are hydrocarbyls of one to ten carbon atoms. Propylene or higher α-olefin is polymerized with rearrangement to form branched polyolefin having 80 to 300 hydrocarbyl branches of one to 10-carbon atoms per 1,000 carbon of the macromolecule. Examples of catalysts which may be used in the preparation of branched polyethylene or branched polyolefin of this invention are exemplified with the following formulas:

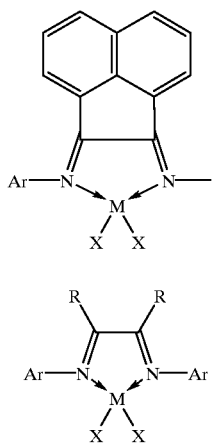

These 1,4-diaza-1,3-butadien-2-yl complexes, commonly called α, β,-dimine complexes, of group VIIIB metal, where M=Pd, Ni; R=H or aliphatic hydrocarbyl of one to ten carbon atoms; Ar =aromatic hydrocarbyl or fluorohydrocarbyl of six to twenty carbon atoms; x=BR, Cl, O-i-Pr, R.

The cocatalyst of the catalyst composition of the present invention may comprise a wide variety of species which are known to abstract anionic ligands bound to group IVB or VIIIB transition metals.

Examples for neutral reducible Lewis acids which may be used in the preparation of the catalyst of the present invention are as follows: tris(pentafluorophenyl)borane, tris (ditrifluoromethylphenyl)borane, tris (2,2,2-perfluorobiphenyl) bonane.

Examples of Bronsted acids which may be used in the preparation of the catalyst are as follows: phenylammonium tetrakis(pentafluorophenyl)borate, diphenylammonium tetrakis(pentafluorophenyl)borate and tributylammonium tetrakis (pentafluorophenyl) borate.

Examples for the oxymetalloids which may be used in the preparation of the catalyst of the present invention are as follows: oligomers of methylaluminoxane (MAO), ethylaluminoxane, propylaluminoxane and butylaluminoxane.

The main rationale for the choice of a cocatalyst is the degree of interaction between the metallocene cation and the counter-anion, either by close approach for ion pair formation or via electron deficient-methyl bridges. Strong interaction tends to lower catalytic activity, selectivity, molecular weight, and most important of all, interference with the cross-over process. Therefore, the cocatalyst employed most frequently in this work is triphenylcarbenium tetrakis (penta-fluorophenyl)-borate described by Chien et al. *J. Am. Chem. Soc.* 1991, 113, 8570, which is free of the drawbacks of the other cocatalysts. It is designated hereinafter as the "Cocat" unless otherwise noted.

Using any of the above catalyst compositions as a single produces only a single kind of homopolymer. Using two of the above catalysts together, there is produced a mixture of two different homopolymers that are immiscible. Thus, the present invention provides a novel component cross-over agent. If any of the above catalysts employed are isospecific and/or aspecific, they produce individually and independently isotactic polypropylene and atactic polypropylene. In the presence of a cross-over agent, as provided for in the present invention, however, the product is a naturally compatible blend of the isotactic and atactic polypropylenes. A new substance is formed in the presence of the cross-over agent that is not formed in its absence. Its presence is established by fractionation of the product and $^{13}C$ NMR determination of the polymer microstructure. In the absence of the cross-over agent, solvent extraction results in two dominant fractions with NMR spectra characteristic for the isotactic and for the atactic polypropylene. In the presence of a cross-over agent, an additional fraction is isolated whose NMR spectra is clearly the sum of the isotactic and atactic sequence (FIG. 1). It is, therefore, a stereoblock copolymer (see U.K. Letters Patent No. 9102679.9). The same is true for the other polymerizations of the present invention whereupon the corresponding block polymers are formed.

The role of the cross-over agent is to transfer the propagating chain on one metal center carrying it to the other metal center and vice versa. Consequently, the next monomers inserted will have the respective stereodirecting influence of the new metal center.

Therefore, the catalyst composition of the present invention provides for the use of a cross-over agent selected from the group of hydrocarbyls and oxyhydrocarbys of group IIIA metal. Illustrative of the present invention, but not limiting examples are as follows: trimethylaluminum, triethylaluminum, tri-i-propylaluminum, tri-i-butylaluminum, compounds containing two or more Al atoms linked through heteroatoms such as: $(C_2H_5)_2$, Al—O—Al, $(H_2)_{5\ 2}$ methylaluminoxane, ethylaluminoxane, butylaluminoxane, $(C_2H_5)2\ A_1$—N$(C_6H_5)$—Al$(C_2H_5)_2$— Al—O$(SO_2)$—O—Al$(C_2H_5)_2$. Group IIA hydrocarbyls may also function in crossover capacity albeit with a lowered efficiency. Finally, in the absence of a cross-over agent, the chains belonging to different metal centers may interchange directly. This probably occurs to a noticeable degree only at very high catalyst concentration, which is not an economically viable condition. Consequently, the use of the cross-over agent is required for the direct "one-pot" synthesis of compatible polymer blends.

Figure 2:
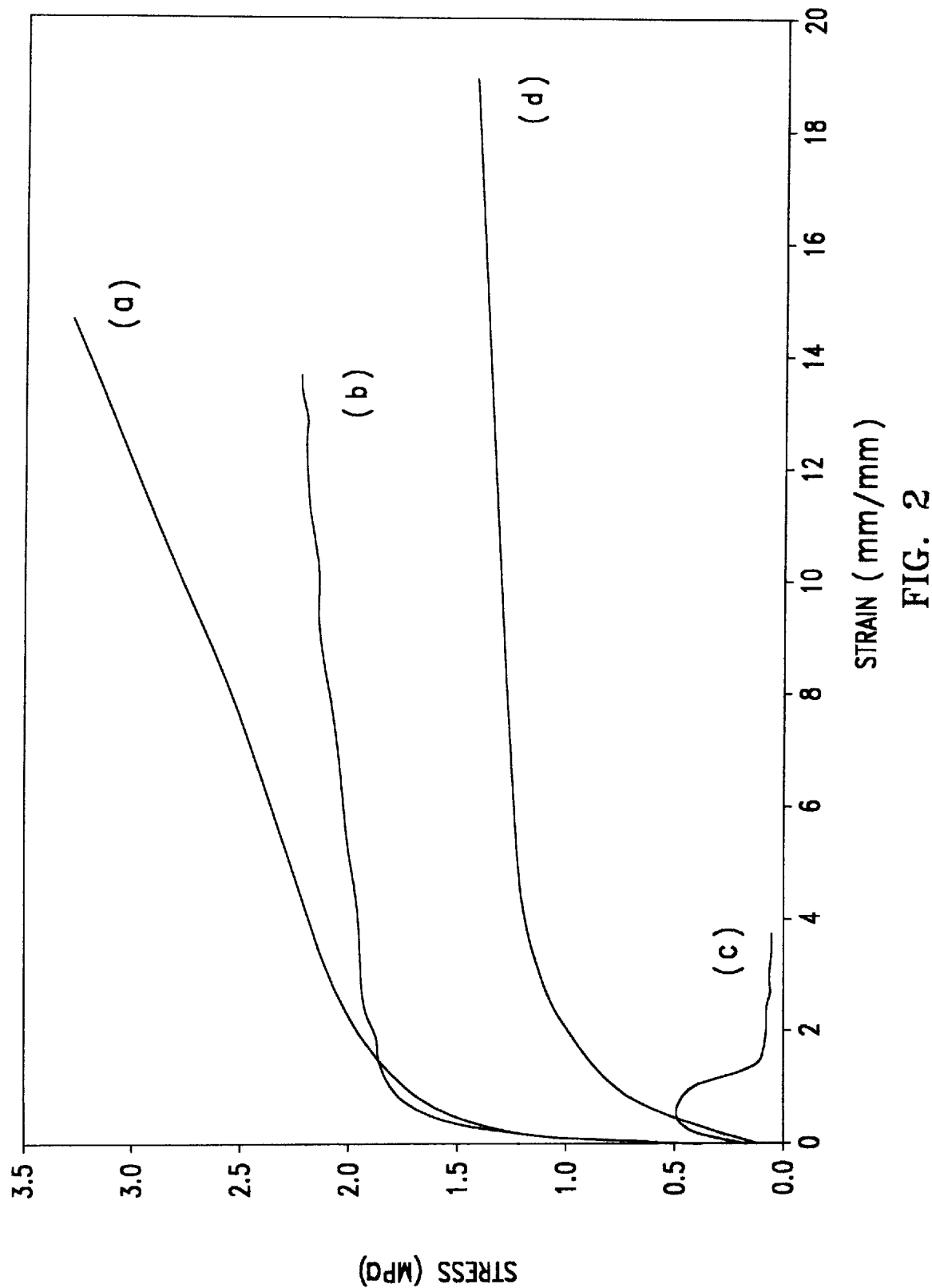
FIG. 2 illustrates the stress-strain curves of (a) a compatible isotactic/atactic polypropylene as found in Example 1 of the present invention; (b) the polypropylene obtained in the presence of Cat. 1 (iso-P) and Cat. 3 (ata-P) catalysts immobilized on silica; (c) the atactic polypropylene synthesized with Cat. 3 (ata-P) alone; and (d) the solvent casted blend of atactic polypropylene and isotactic polypropylene obtained separately with Cat. 2 (iso-P) and Cat. 3 (ata-P)

The outstanding properties of the polymers of the present invention can be readily shown by testing. The stress-strain curves in FIG. 2a of the compatible isotactic/atactic blend of example 1 of the present invention shows that it increases in strength with strain up to 1100% elongation which is characteristic of a crosslinked elastomer. The α-PP (curve d) does not show any yield point, but a nearly perfect stress plateau until it breaks. This phenomenom is considered to be due to the high degree of entanglement in the high molecular weight atactic polymer. The application of the high extension rate of 1000% min. does not allow the material to disentangle in experimental time, and to flow. The solution casted blend of separately prepared isotactic and atactic polypropylene is a brittle substance without strength (curve c) indicating substantial macrophase separation in this specimen.

Figure 3:
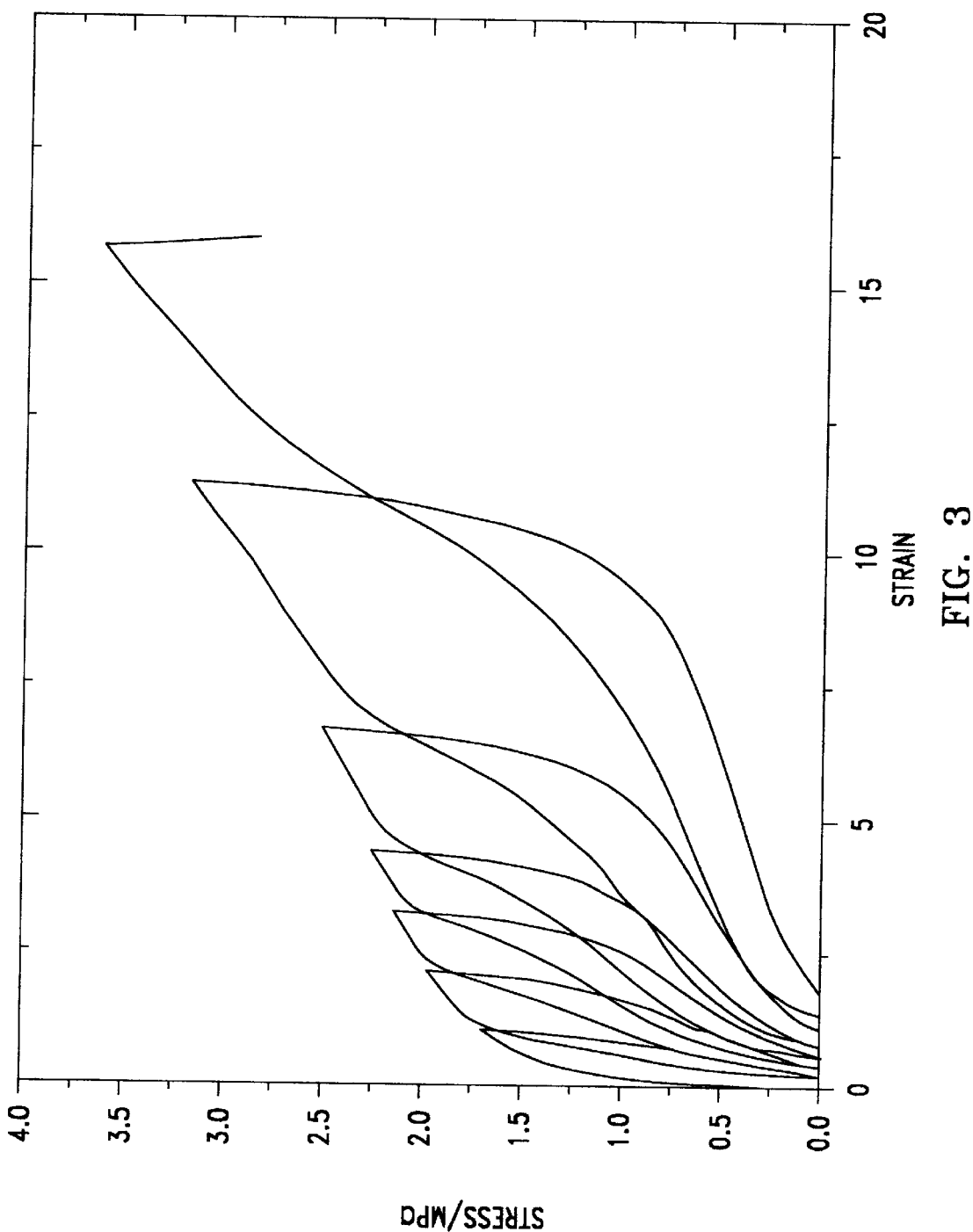
FIG. 3 illustrates the relaxation time testing of the compatible isotactic/atactic polypropylene blend in Example 1 of the present invention.

FIG. 3 illustrates the outstanding elasticity of the compatible blend by the hysteresis curves of tensile stress measurements. Note that the expansion curve returns to the previous stress at its previous maximum strain.

Figure 4:
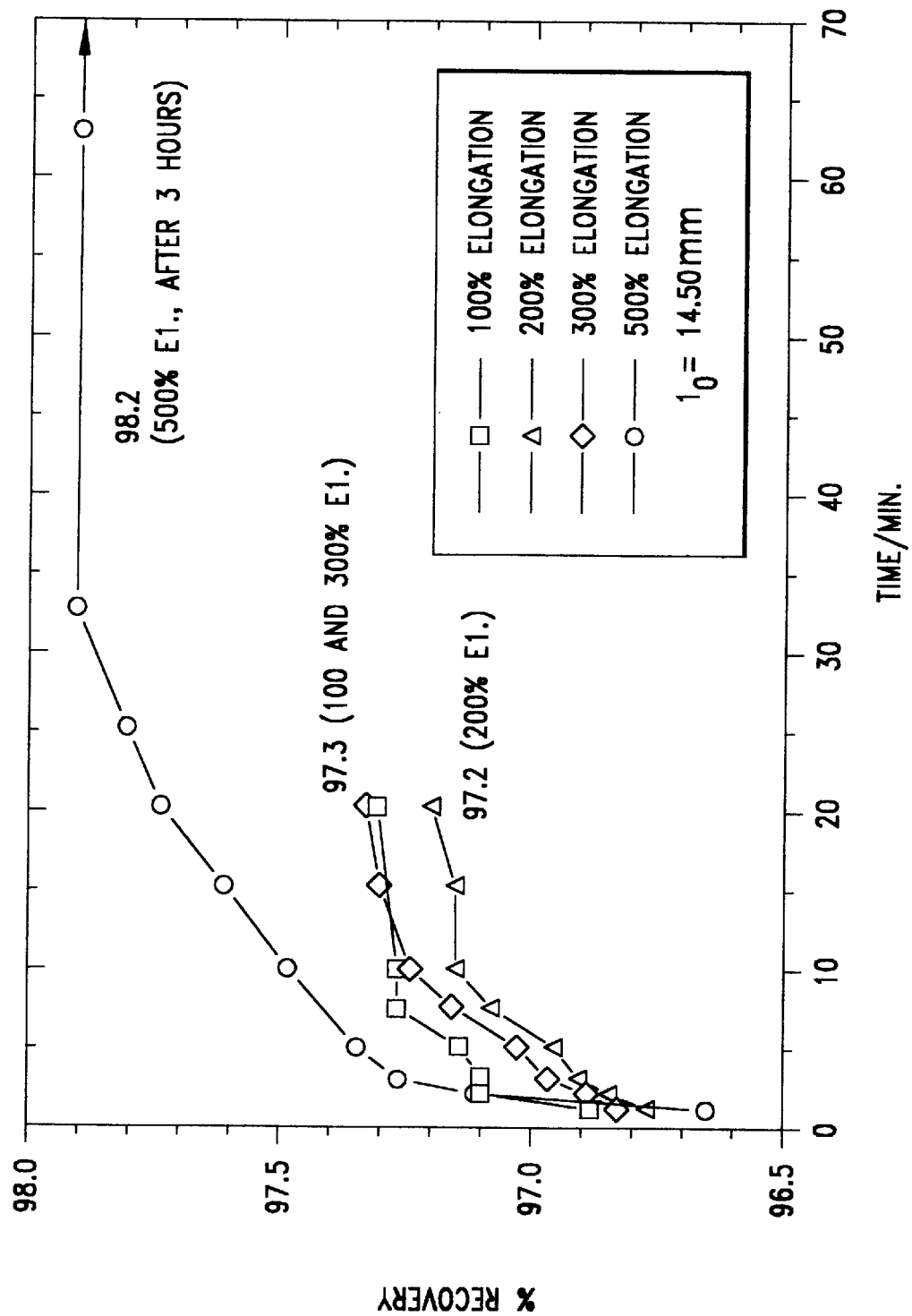
FIG. 4 illustrates the percentage of elastic recovery for the compatible isotactic/atactic polypropylene in Example 1 of the present invention.

FIG. 4 gives the percentage of recovery of the compatibly blended material. Although the residual expansion of the specimen was increased at higher strain, the recovery rate of the compatibly blended polymer was consistent at 97–98% between 100% to 500% elongation, which is very high compared to other polymers of this type. In contradistinction either α-PP alone or blended with i-PP is virtually without elasticity.

Figure 5:
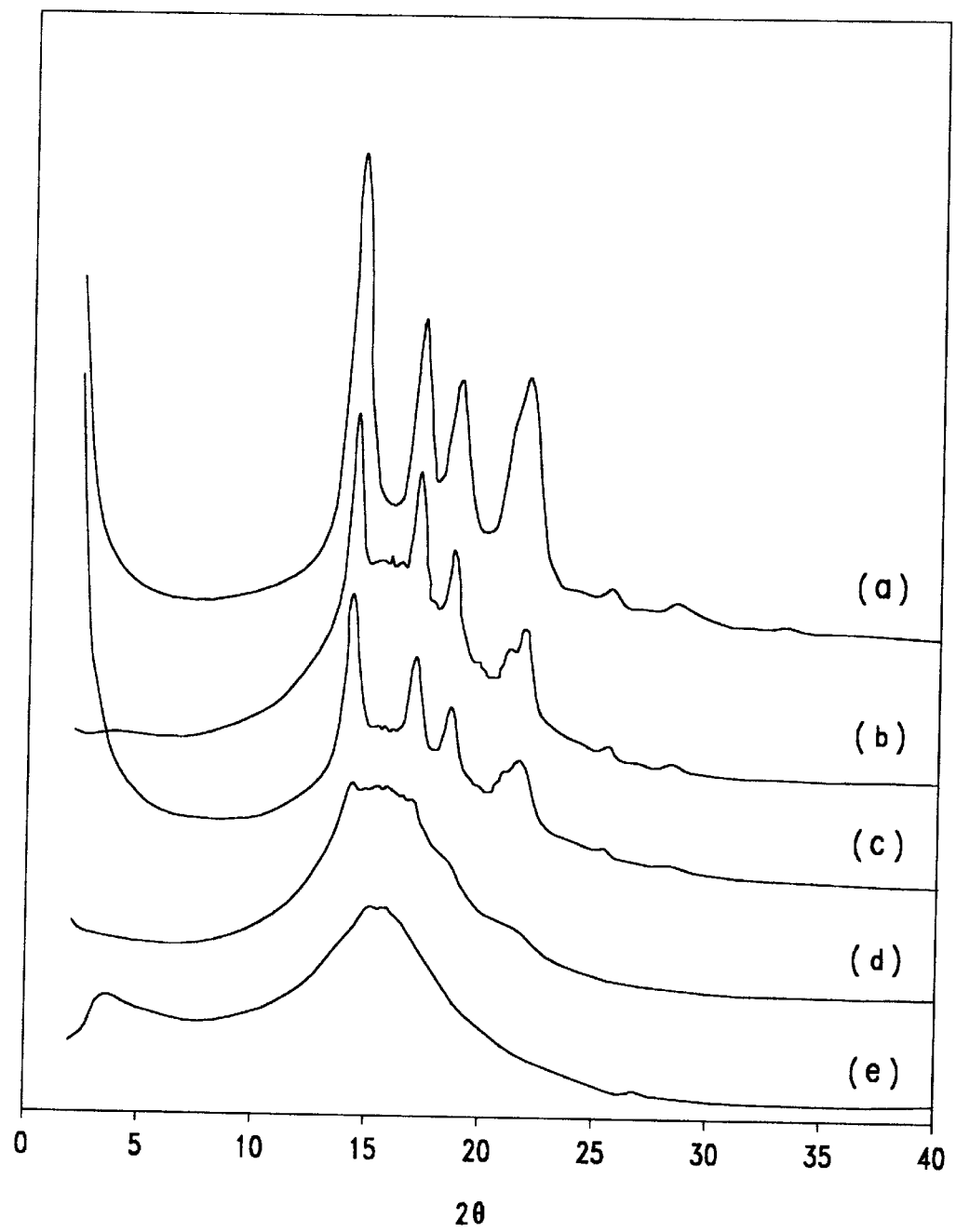
FIG. 5 illustrates the X-ray diffraction patterns of: (a) the isotactic polypropylene obtained with Cat. 1 alone; (b) the solution-casted blend of isotactic polypropylene obtained with Cat. 1 and atactic polypropylene obtained with Cat. 3; (c) the isotactic/atactic polypropylene blend synthesized with Cat. 1 and Cat. 3 immobilized on silica; (d) the compatible isotactic/atactic polypropylene blend in example 1 of the present invention; and (e) the atactic polypropylene obtained with Cat. 3 alone.
Figure 6:
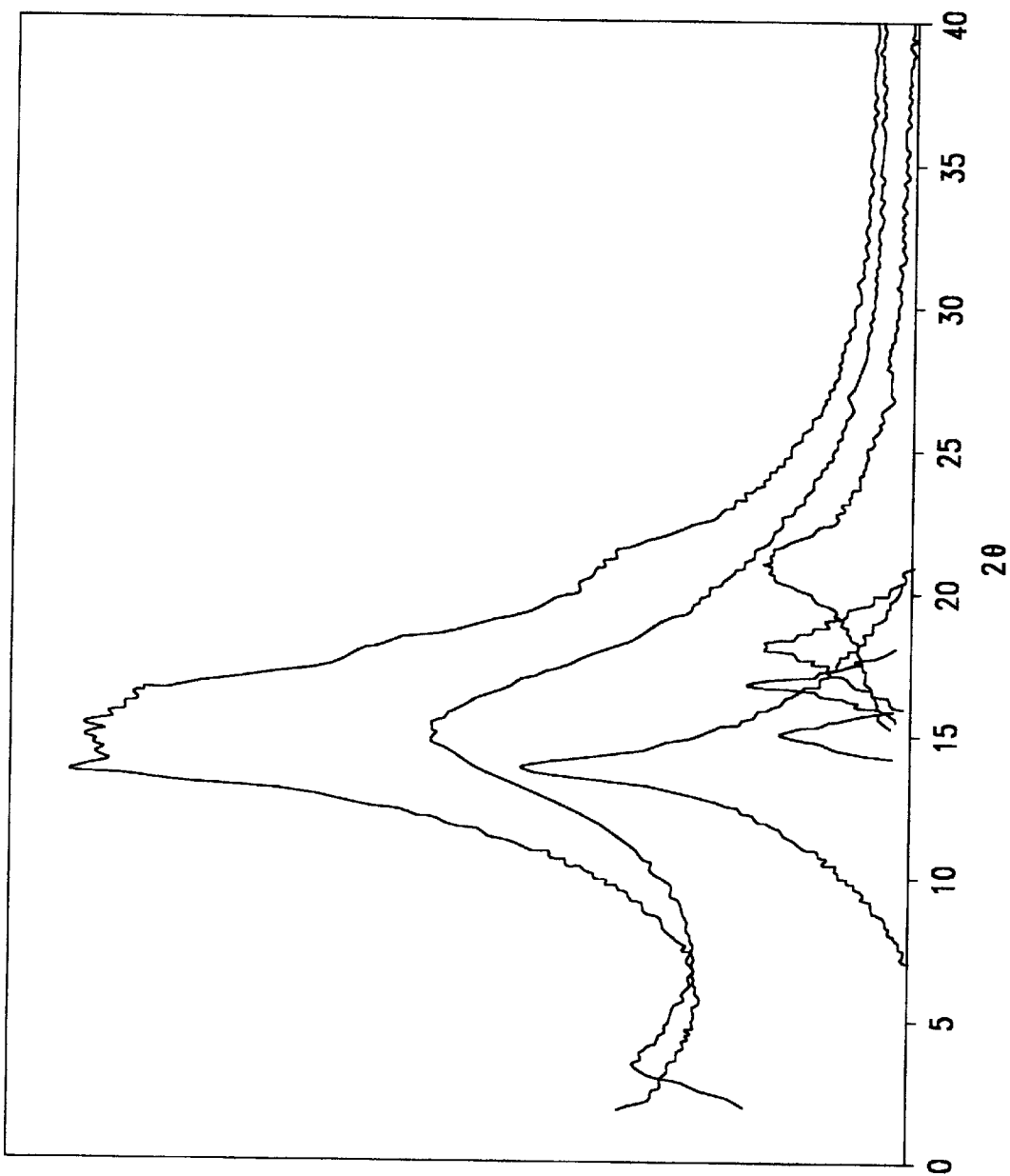
FIG. 6 illustrates the deconvolution analysis of the XRD pattern in FIG. 5d.

Thermal and X-ray diffraction (XRD) data support the conclusion that the compatible polymer blend is morphologically different from the separately synthesized homopolymers. At the same isotactic polypropylene to atactic polypropylene ratio, the two types of materials have the same heat of fusion. The XRD of the latter blend (FIG. 5b), however, is seen to be a superimposed isotactic polypropylene on the amorphous halo indicating large size isotactic crystallites and macrophase separation. In contrast, the XRD of the directly synthesized compatible polymer blend of example 1 of the present invention (FIG. 5d) barely shows a hint of the a reflections. The reflections become resolved with a deconvolution analysis (FIG. 6). In other words the crystallite sizes are minute indicating phase boundary mixing through interpenetration of domains and there is only microphase separation.

The present invention applies to catalyst compositions to polymerize more than one monomer to prepare compatible blends of homopolymers and copolymers of terpolymers. Ethylene-selection catalyst [Ind-Si(Me)$_2$-Ind]ZnCl$_2$ is used to homopolymerize ethylene in the presence of other olefinic monomers and olefin copolymerization catalyst Me$_2$Si (Me$_4$Cp)(M-t-butyl)TiCl$_2$ is used to copolymerize or terpolymerize ethylene with other olefins or dienes, respectively, with a common cocatalyst and cross-over agent. This catalyst composition provides for the "one-pot" direct synthesis of materials of projection 1 wherein A is polyethylene and B is ethylene-propylene copolymer, or ethylene-hexene copolymer, or ethylene-octene copolymer, or ethylene-propylene-ethylidene norbonene terpolymer, or ethylene-propylene-butadiene terpolymer, or ethylene-propylene-1,4-hexadiene terpolymer.

The following examples specifically illustrate the present invention.

EXAMPLE 1

An isospecific and a nonspecific catalyst were employed in the polymerization. A 250 mL crown-capped glass pressure reactor with a magnetic stirring bar was first evacuated, flushed with argon, then charged with 50 mL of toluene. The system was evacuated again and saturated with propylene for ca. 20 min. to 15 psig. Tri-i-butyl aluminum (5 mM), rac-dimethylsilyienebis(1- $\eta^5$-indenyl)dichlorozirconium (Cat. 1, 4 $\mu$M) and ethylenebis(9- $\eta^5$-fluorenyl) dichlorozirconium (Cat. 3, 6 $\mu$M) were injected with syringe as toluene solutions. The system was heated to the desired temperature (T$_p$), stirred for ca. 20 additional min. to saturate it with propylene at this temperature. Finally a toluene solution of the cocatalyst (Cocat, 10 $\mu$M) was introduced to initiate the polymerization. Upon completion, the polymerization mixture was quenched with acidic methanol (containing 2% HCL), filtered, washed with methanol, and dried at 70° C. under vacuum to a constant weight 4.38 g of a thermoplastic elastomer was obtained.

A sample was fractionated using several solvents under refluxing conditions. Acetone did not dissolve any polymer, but diethyl ether extracted 50.7 wt % of polymer, which has the $^3$C NMR of atactic polypropylene (FIG. 1c). Pentane and hexane did not dissolve any polypropylene. Refluxing heptane extracted 7 wt %, the NMR spectra of which (FIG. 1b) is that of an isotactic/atactic block copolymer. The remaining 42 wt % heptane insoluble materials are the isotactic polypropylene (FIG. 1a). The catalytic activity of polymerization was 7.3×10$^7$ g PP/(mol Zr.[C$_3$H$_6$].h). The product has a peak melting transition of 149.3° C., heat of fusion $\Delta H_f$=11.5 cal/g.

EXAMPLES 2–15

Example 1 was repeated except that the conditions indicated in Table I were employed.

TABLE 1$^a$

| | [Cat 1] ($\mu$M) | [Cat 3] ($\mu$M) | [TIBA] (mM) | Yield (g) | A × 10$^{-7}$ g PP/(mol Zr · [C$_3$H$_6$] · h) | Tm (° C.) | $\Delta$Hf (cal/g) |
|---|---|---|---|---|---|---|---|
| Example | | | | | | | |
| 1 | 4 | 6 | 5 | 4.38 | 7.3 | 149.3 | 11.5 |
| 2 | 5 | 1.3 | 4 | 1.22 | 3.7 | 152.2 | 19.4 |
| 3 | 4 | 4 | 4 | 1.52 | 4.2 | 152.2 | 16.3 |
| 4 | 6 | 6 | 4 | 1.86 | 4.1 | 151.8 | 15.2 |
| 5 | 3 | 7 | 4 | 0.70 | 1.0 | 151.2 | 5.4 |
| 6 | 2 | 8 | 4 | 1.18 | 1.6 | 152.0 | 7.2 |
| 7 | 1 | 9 | 4 | 0.95 | 1.3 | 151.0 | 3.1 |
| 8 | 4 | 1 | 5 | 1.20 | 3.2 | 151.1 | 14.0 |
| 9 | 5 | 3.3 | 5 | 3.10 | 5.0 | 149.8 | 15.7 |
| 10 | 2 | 8 | 5 | 3.24 | 5.4 | 150.0 | 8.9 |
| 11 | 5 | 3.3 | 6 | 1.72 | 6.9 | 152.1 | 11.6 |
| 12 | 4 | 4 | 6 | 1.55 | 6.5 | 151.8 | 9.0 |
| 13 | 4 | 6 | 6 | 2.31 | 6.2 | 150.9 | 5.5 |
| 14 | 3 | 7 | 6 | 2.63 | 7.0 | 150.7 | 3.9 |
| 15 | 2 | 8 | 6 | 1.89 | 5.0 | 150.0 | 2.0 |

$^a$P C$_3$H$_6$ = 15 psig, Tp = 0° C., [Cocat] = [Cat 2] + [Cat 3].

EXAMPLE 16

An isospecific and a nonspecific catalyst were employed in the polymerization. A 250 mL crown-capped glass pressure reactor with a magnetic stirring bar was first evacuated, flushed with argon, then charged with 50 mL of toluene. The system was evacuated again and saturated with propylene for ca 20 min. to 15 psig. Tri-i-butyl aluminum (5 mM), rac-ethylenebis(1- $\eta^5$-indenyl)dichlorozirconium (Cat. 2, 1 $\mu$M) and ethylenebis(9- $\eta^5$-fluorenyl)dichlorozirconium (Cat. 3, 9 $\mu$M) were injected with syringe as a toluene solution. The system was heated to the desired temperature (T$_p$), stirred for ca. 20 additional min. to saturate it with propylene at this temperature. Finally a toluene solution of the cocatalyst (Cocat. 10 $\mu$M) was introduced to initiate the polymerization. Upon completion, the polymerization mixture was quenched with acidic methanol (containing 2% HCL), filtered, washed with methanol, and dried at 70° C. under vacuum. 1.6 g of a thermoplastic elastomeric polypropylene was obtained.

A sample was fractionated using several solvents under refuxing conditions. Acetone did not dissolve any polymer but diethyl ether extracted 90% wt which has $^{13}$C NMR for atactic polypropylene polypropylene. Refluxing hexane extracted 10% wt the NMR spectra of which is that of an isotactic/atactic block copolymer. The catalytic activity of polymerization was 7.3×10$^7$ g PP/(mol Zr.[C$_3$H$_6$].h). The product has a peak melting transition of 149.3° C., heat of fusion $\Delta$Hf=11.5 cal/g and is a very strong thermoplastic elastomer.

EXAMPLES 17–25

Example 16 was repeated except that the conditions indicated in Table II were employed.

TABLE II[a]

| [Cat 2] ($\mu$M) | [Cat 3] ($\mu$M) | [TIBA] (mM) | Tp (° C.) | Yield (g) | A × 10⁻⁷ g PP/ mol Zr · [C$_3$H$_6$] · h | Tm (° C.) | ΔHf (cal/ g) |
|---|---|---|---|---|---|---|---|
| Example | | | | | | | |
| 16 | 8 | 2 | 5 | 0 | 1.91 | 2.1 | 147.7 | 7.4 |
| 17 | 6 | 4 | 5 | 0 | 2.73 | 3.0 | 146.3 | 4.6 |
| 18 | 4 | 6 | 5 | 0 | 2.47 | 2.7 | 146.0 | 2.2 |
| 19 | 2 | 8 | 5 | 0 | 2.87 | 3.2 | 145.5 | 1.2 |
| 20 | 1 | 9 | 5 | 0 | 1.60 | 0.7 | 145.3 | 0.5 |
| 21 | 6 | 4 | 5 | 25 | 4.55 | 8.4 | 141.2 | 8.2 |
| 22 | 4 | 6 | 5 | 25 | 4.33 | 8.0 | 140.5 | 5.7 |
| 23 | 3 | 7 | 5 | 25 | 5.10 | 9.5 | 138.9 | 3.9 |
| 24 | 2 | 8 | 5 | 25 | 5.34 | 9.9 | 137.9 | 2.7 |
| 25 | 1 | 9 | 5 | 25 | 5.84 | 10.8 | 135.7 | 0.9 |

[a]P C$_3$H$_6$ = 15 psig, Tp = 0° C., [Cocat] = [Cat 2] + [Cat 3].
[b]TPE = thermoplastic elastomer; E = elastomer.

EXAMPLE 26

A syndiospecific and a nonspecific catalyst were employed in the polymerization. A 250 mL crown-capped glass pressure reactor with a magnetic stirring bar was first evacuated, flushed with argon, then charged with 50 mL of toluene. The system was evacuated again and saturated with propylene for ca. 20 min. to 15 psig. Tri-i-butyl aluminum (5 mM), diphenylmethylidene(1- $\eta^5$-cyclopentadienyl)(9- $\eta^5$-fluorenyl)dichlorozirconium (Cat. 4, 10 $\mu$M) and ethylenebis(9- $\eta^5$-fluorenyl)dichlorozirconium (Cat. 3, 15 $\mu$M) were injected with syringe as toluene solution. The system was heated to the desired temperature (T$_p$), stirred for ca. 20 additional min. to saturate it with propylene at this temperature. Finally a toluene solution of the cocatalyst (Cocat, 10 $\mu$M) was introduced to initiate the polymerization. Upon completion, the polymerization mixture was quenched with acidic methanol (containing 2% HCL) filtered, washed with methanol, and dried at 70° C. under vacuum to give 3.43 g of thermoplastic elastomeric polypropylene.

The catalytic activity was 7.8×10⁷ g PP/(mol Zr.(C$_3$H$_6$].h). The TPE polypropylene product had a peak melting transition of T$_m$=137.6° C. and heat of fusion of ΔH$_f$=23.9 cal/g.

Figure 7:
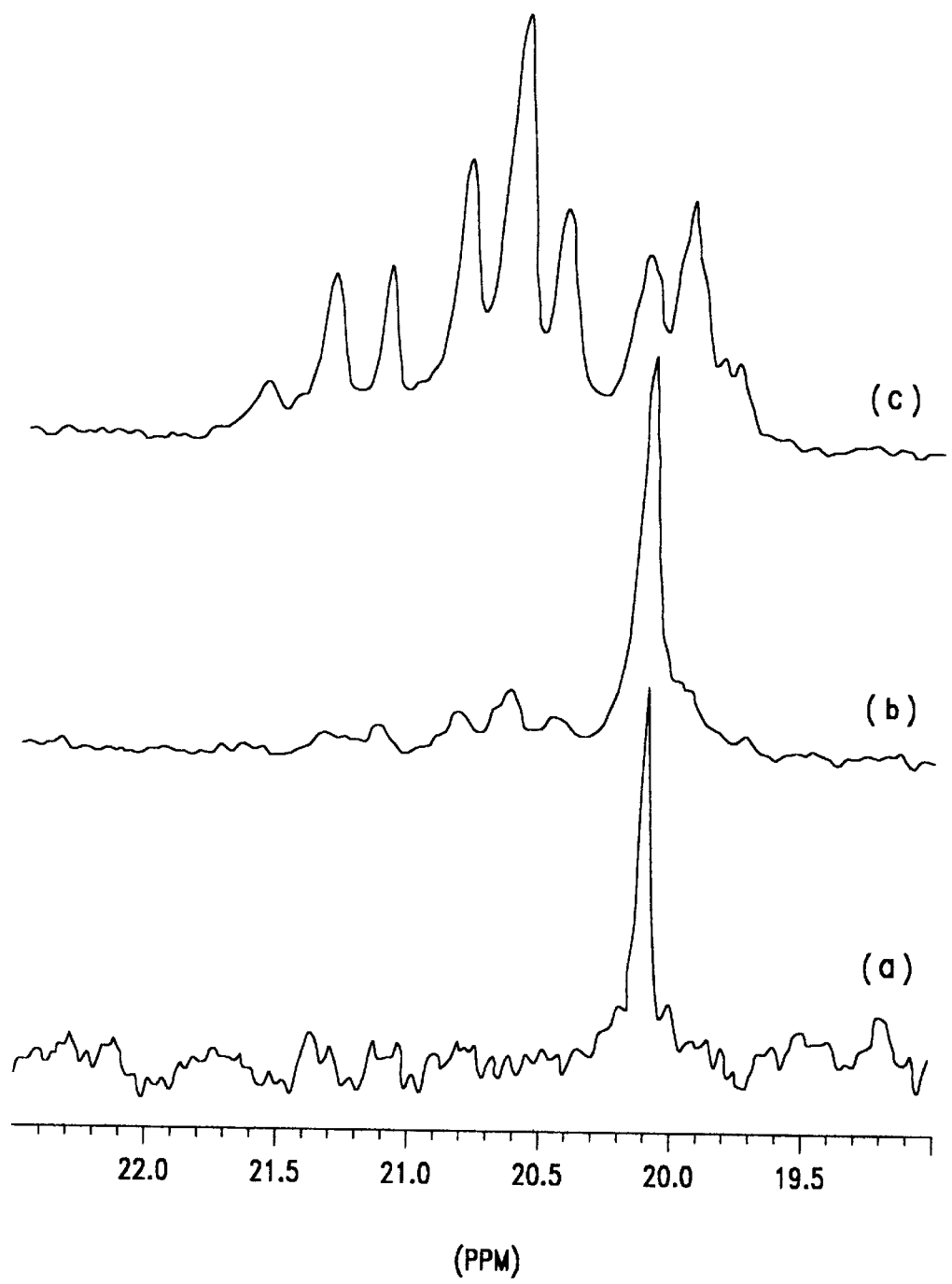
FIG. 7 illustrates the room temperature $^{13}$C NMR spectra in the methyl region of the syndiotactic polypropylene in Example 26 of the present invention: including (a) the heptane insoluble syndiotactic fraction; (b) the heptane and hexane soluble stereoblock fraction; and (c) the diethylether soluble atactic fraction.
Figure 8:
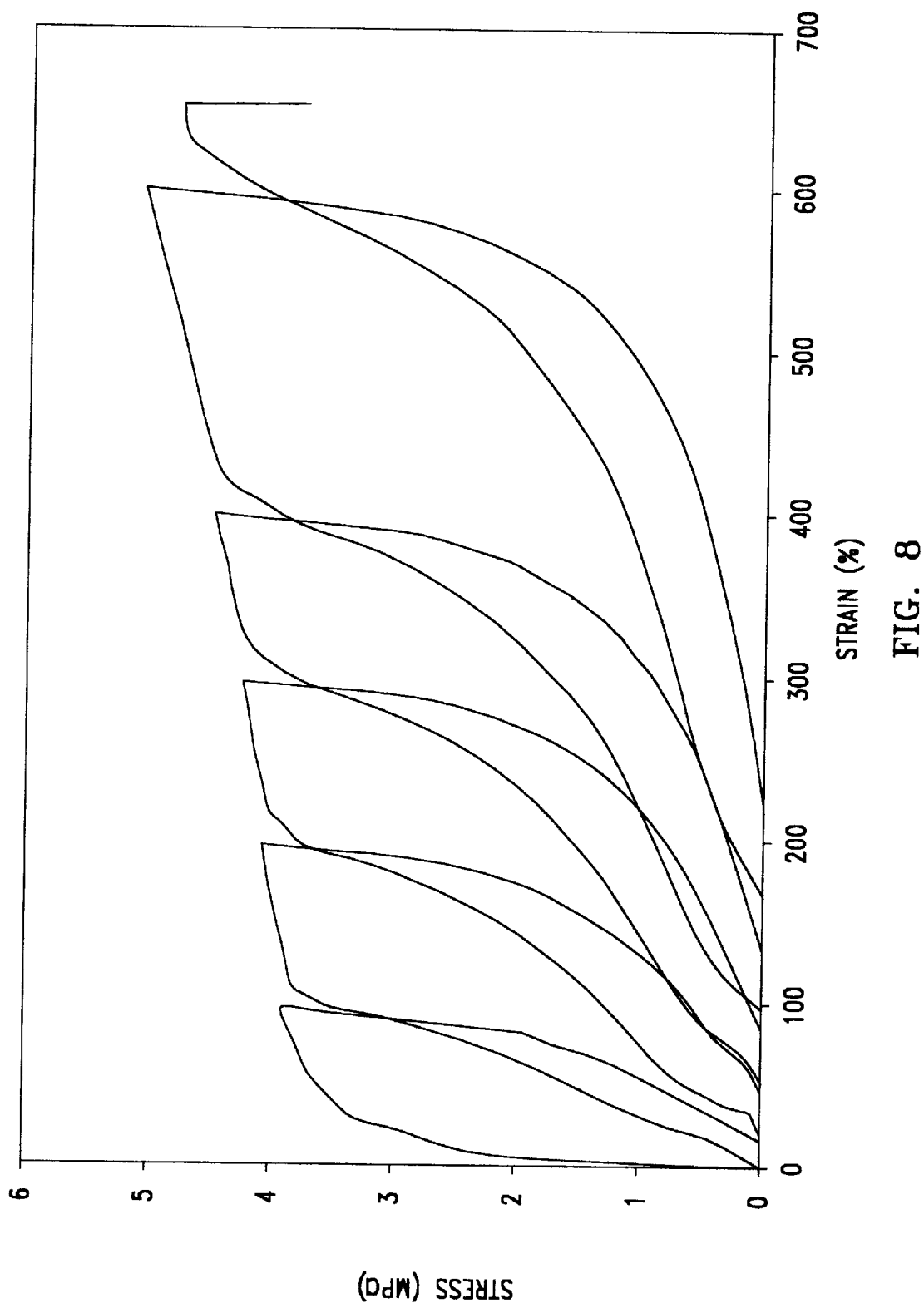
FIG. 8 illustrates the relaxation time testing of the compatible syndiotactic/atactic polypropylene blend in Example 26 of the present invention.

A sample was fractionated using several solvents under refluxing conditions. Acetone did not dissolve any polymer but diethyl ether extracted 65.7 wt % which has ¹³C NMR for atactic polypropylene (FIG. 7c) with [rrrr]=0.11 and total for all other pentads=0.89. Pentane did not dissolve any polypropylene. Refluxing hexane extracted 5.5 wt % and refluxing heptane extracted 16.1 wt % of the sample. Their NMR spectra (FIG. 7b) is that of a syndiotactic/atactic block copolymer with [rrrr] =0.67 and total for all other pentads= 0.33. The remaining 12.7 wt % heptane insoluble material is the syndiotactic polypropylene with [rrrr]=1.0 (FIG. 7a).

EXAMPLES 27–33

Example 26 was repeated except that the conditions indicated in Table III were employed.

TABLE III[a]

| [Cat 2] ($\mu$M) | [Cat 3] ($\mu$M) | [TIBA] (mM) | Tp (° C.) | Yield (g) | A × 10⁻⁷ g PP/ mol Zr · [C$_3$H$_6$] · h | Tm (° C.) | ΔHf (cal/ g) |
|---|---|---|---|---|---|---|---|
| Example | | | | | | | |
| 26 | 10 | 15 | 5 | 0 | 2.3 | 3.43 | 138.5 | 8.05 |
| 27 | 5 | 0 | 5 | 0 | 0.77 | 2.0 | 150.2 | 20.7 |
| 28 | 5 | 20 | 5 | 0 | 3.09 | 5.5 | 137.6 | 5.7 |
| 29 | 5 | 0 | 5 | 25 | 0.65 | 3.0 | 138.5 | 20.6 |
| 30 | 6 | 4 | 5 | 25 | 2.91 | 6.7 | 132.7 | 8.05 |
| 31 | 4 | 6 | 5 | 25 | 3.41 | 6.3 | 130.5 | 4.52 |
| 32 | 2 | 8 | 5 | 25 | 4.79 | 6.7 | 132.9 | 3.82 |
| 33 | 1 | 9 | 5 | 25 | 4.79 | 6.7 | 129.0 | 1.72 |

[a]P C$_3$H$_6$ = 15 psig, [Cocat] = [Cat 5] + [Cat 3].
[b]sample not annealed prior to DSC scan.

EXAMPLE 34

A syndiospecific catalyst and an isospecific catalyst were employed in the polymerizations. A 250 mL crown-capped glass pressure reactor with a magnetic stirring bar was first evacuated, flushed with argon, then charged with 50 ml of toluene. The system was evacuated again and saturated with propylene for ca. 20 min. to 15 psig. Tri-i-butyl aluminum (5 mM), diphenylmethylidene(1- $\eta^5$cyclopentadienyl)(9- $\eta^5$-fluorenyl) dichlorozirconium (Cat. 5, 5 $\mu$M) and rac-ethylenebis(1$\eta^5$-indenyl)dichlorozirconium (Cat. 2, 5 $\mu$M) were injected with syringe as toluene solution. The system was heated to the desired temperature (T$_p$), stirred for ca. 20 additional min. to saturate it with propylene at this temperature. Finally a toluene solution of the cocatalyst (Cocat, 10 $\mu$M) was introduced to initiate the polymerization. Upon completion, the polymerization mixture was quenched with acidic methanol (containing 2% HCl), filtered, washed with methanol, and dried at 70° C. under vacuum yielding 0.67 g of plastomer. The activity of polymerization was 3.4×10⁷ g PP/(mol Zr.[C$_3$H$_6$].h). The plastomer has a peak melting transition of T$_m$=148.0° C. and ΔH$_f$=20.7 cal/g. It has a rapid isothermal crystallization rate, the slope of which is only 0.2 mwatt/g/min at 30 min. The slope of isothermal crystallization rate for pure syndiotactic polypropylene and its 1:1 blend mixture with at 109.1° and 114.3° C., respectively, is 0.7 and 0.8 mwatt/g/min.

EXAMPLES 35–37

Example 34 was repeated except that the conditions indicated in Table IV were employed.

TABLE IV[a]

| [Cat 1] ($\mu$M) | [Cat 5] ($\mu$M) | [TIBA] (mM) | Yield (g) | A × 10⁻⁷ g PP/(mol Zr · [C$_3$H$_6$] · h | Tm (° C.) | ΔHf (cal/ g) |
|---|---|---|---|---|---|---|
| Example | | | | | | |
| 34 | 5 | 5 | 5 | 0.64 | 3.4 | 148.0 | 13.8 |
| 35 | 0 | 5 | 5 | 0.77 | 2.0 | 150.2 | 20.7 |
| 36 | 8 | 2 | 5 | 0.74 | 2.5 | 140.2 | 14.9 |
| 37 | 10 | 0 | 5 | 2.15 | 1.9 | 152.0 | 30.5 |

[a]P C$_3$H$_6$ = 15 psig, T$_p$ = 0° C., [Cocat] = [Cat 1] + [Cat 4].

EXAMPLES 38–45

Methylaluminoxane was employed as the cocatalyst for examples 38 to 45. A 250 mL crown-capped glass pressure reactor with a magnetic stirring bar was first evacuated, flushed with argon, then charged with 50 mL of toluene. The system was evacuated again and saturated with propylene for ca. 20 min. to 15 psig. Tri-i-butyl aluminum (5 mM), rac-ethylenebis(1- $\eta^5$-indenyl))dichlorozirconium (Cat. 2, 10 $\mu$M) and ethylenebis(9- $\eta^5$fluorenyl)dichlorozirconium (Cat. 3, 40 $\mu$M) were injected with syringe as toluene solution. The system was heated to the desired temperature ($T_p$), stirred for ca. 20 additional min. to saturate it with propylene at this temperature. Finally a toluene solution of methylaluminum as the cocatalyst (100 mM) was introduced to initiate the polymerization. TIBA was omitted in examples 38 to 41. The conditions are as indicated in Table V. Upon completion the polymerization mixture was quenched with acidic methanol (containing 2% HCL), filtered, washed with methanol, and dried at 70° C. under vacuum to a constant weight.

TABLE V[a]

| Example | [Cat 1] ($\mu$M) | [Cat 3] ($\mu$M) | [TIBA] (mM) | [MAO][b] | $T_p$ (° C.) | Time (min) | Yield (g) | A × 10$^{-7}$ g PP/ mol Zr · [C$_3$H$_6$] · h |
|---|---|---|---|---|---|---|---|---|
| 38 | 10 | 40 | 0 | 0 | 0 | 120 | 0.29 | 0.07 |
| 39 | 10 | 40 | 0 | 0 | 24 | 60 | 1.81 | 1.2 |
| 40 | 10 | 40 | 0 | 0 | 50 | 30 | 3.61 | 9.2 |
| 41 | 10 | 40 | 0 | 0 | 75 | 30 | 2.07 | 33.0 |
| 42 | 10 | 40 | 5 | 25 | 0 | 60 | 0.62 | 0.31 |
| 43 | 10 | 40 | 5 | 25 | 25 | 30 | 3.60 | 4.8 |
| 44 | 10 | 40 | 5 | 25 | 50 | 15 | 7.20 | 38.0 |
| 45 | 10 | 40 | 5 | 25 | 75 | 15 | 8.3 | 132. |

[a]C$_3$H$_6$ = 15 psig,
[b]MAO = methylaluminoxane

Products of examples 38 to 40 contain less than 2% by weight of diethylether insoluble-heptane soluble isotactic-atactic block copolymers, whereas the products of examples 42 to 44 contain about 10% of this fraction.

EXAMPLE 46

An isospecific catalyst (Cat. 1) and a rearrangement polymerization Cat. 7 (M=Ni, X=Br, Ar=2, 4.6—C$_6$M$_2$Me$_3$) were employed to polymerize and block copolymerize propylene. branching catalyst (Cat. 5) were employed to polymerize and block copolymerize propylene. In one Schlenk tube a solution of Cat. 2 and MAO were mixed one hour prior to use; another Schlenk tube was used to similarly preativate Cat. 5 with MAO. A 250 mL crown-capped glass pressure reactor with a magnetic stirring bar was first evacuated, flushed with argon and charged with 50 mL of toluene. The system was evacuated again and saturated with propylene for ca. 20 min. to 15 psig. Methylaluminoxane (5 mM) was introduced. Finally the two preactivated catalyst solutions were injected to initiate the polymerization. Upon completion, the polymerization mixture was quenched with acidic methanol (containing 2% HCL), filtered, washed with ethanol and dried at 700° C. under vacuum to a constant weight.

Figure 9:
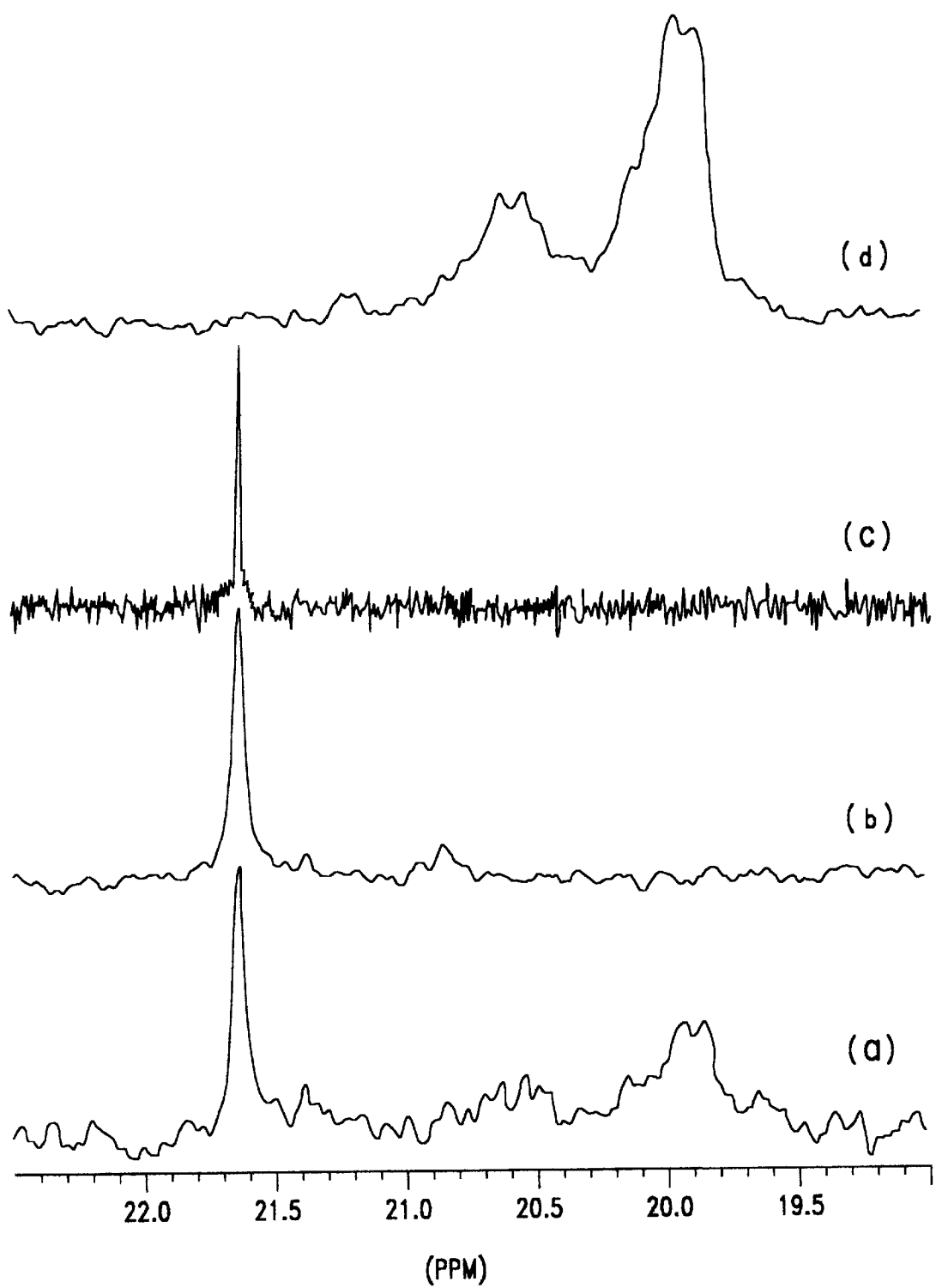
FIG. 9 illustrates the room temperature $^{13}$C NMR spectra of the methyl region of the polypropylene in Example 46 of the present invention including: (a) the diethyl ether soluble fraction, (b) the hexane soluble fraction, (c) the heptane soluble fraction, and (d) the heptane insoluble fraction.
Figure 10:
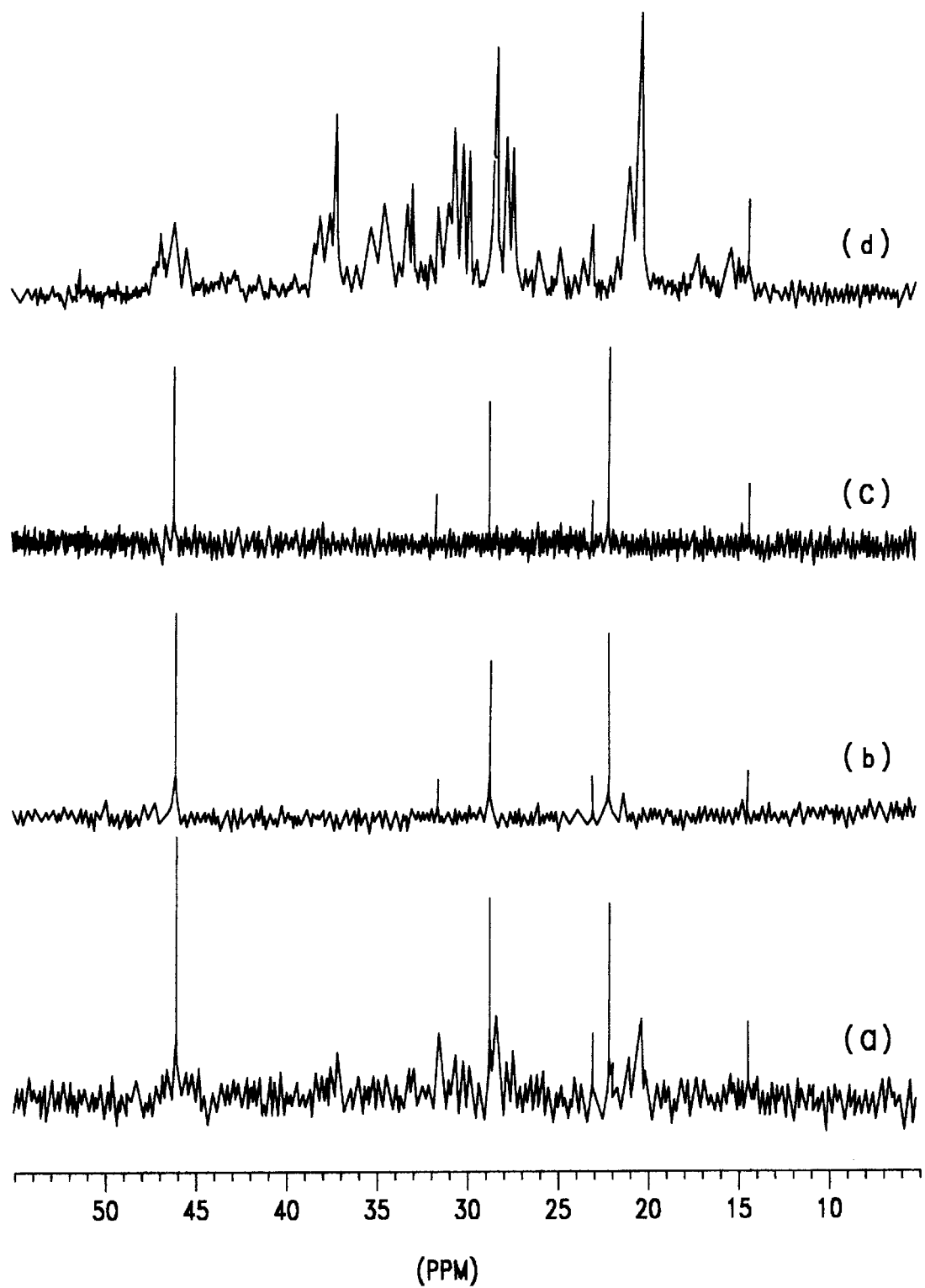
FIG. 10 illustrates the room temperature $^{13}$C NMR spectra of the secondary and tertiary carbon resonances of the polypropylene in Example 46 of the present invention including: (a) the diethylether soluble fraction, (b) the hexane soluble fraction, (c) the heptane soluble fraction, and (d) the heptane insoluble fraction.

The product of example 46 was fractionated and $^{13}$C NMR spectra determined. The diethyl ether soluble fraction is that of branched polypropylene which has very complicated s+t carbon resonances (FIG. 10d) and syndiotactic methyl resonances (FIG. 9d). (Table VI) The hexane and heptane soluble fractions are mainly low molecular weight isotactic polypropylene. The heptane insoluble fraction contains most of the block copolymer of branched and isotactic sequences.

TABLE VI[a]

| | | $^{13}$C-NMR methyl region | | | |
|---|---|---|---|---|---|
| Fraction of polymer of example 46 | wt % | Figure | [mmmm] (%) | All other penthads (%) | $^{13}$C-NMR s and t carbon Figure |
| Acetone soluble | 3.0 | | | | |
| Diethyl ether soluble | 27.5 | 9d | 0 | 100 | 10d |
| Pentane soluble | 0.3 | | | | |
| Hexane soluble | 2.0 | 9c | 100 | 0 | 10c |
| Heptane soluble | 16.1 | 9b | >90 | <10 | 10b |
| Heptane insoluble | 58.3 | 9a | 24 | 76 | 10a |

EXAMPLES 47–49

Example 46 was repeated except that the conditions in Table VII were employed.

TABLE VII[a]

| Example | [Cat 9] ($\mu$M) | [Cat 1] ($\mu$M) | [MAO][b] (mM) | A × 10$^{-7}$ g PP/ mol Zr · [C$_3$H$_6$] · h | $T^g$ ° C. | $T_m^b$ 1° C. | $T_m^c$ 2° C. | $\Delta H_f$ Cal g |
|---|---|---|---|---|---|---|---|---|
| 46 | 200 | 20 | 220 | 6.9 | −20 | 127.8 | 141.9 | 20.1 |
| 47 | 100 | 20 | 120 | 11.7 | −20 | 127.8 | 142.3 | 27.9 |
| 48 | 50 | 20 | 70 | 15.4 | −20 | 127.8 | 143.1 | 25.0 |
| 49 | 200 | 0 | 200 | 1.7 | −35 | — | — | — |

[a]C$_3$H$_6$ = 15 psig, $T_p$ = 20° C.;
[b]Shoulder;
[c]peak melting temperature.

EXAMPLES 50–53

Example 46 was repeated except using ethylene as the monomer and the other conditions indicated in Table VIII. The products of example 51 and 52 were extracted with refluxing solvent and examined with $^{13}$C NMR. The diethyl ether soluble fraction exhibits the $^{13}$C NMR spectra of branched polyethylene. The hexane soluble fraction displays the $^{13}$C NMR spectra of isomeric block copolymer. The spectra of the hexane insoluble fraction is that of linear polyethylene.

TABLE VIII[a]

|  | [Cat 8] (μM) | [Cat 2] (μM) | [MAO][b] (mM) | A × $10^{-7}$ g PP/mol Zr · [$C_3H_6$] · h |
|---|---|---|---|---|
| Example 50 | 25 | 0 | 120 | 1.0 |
| 51 | 25 | 10 | 60 | 2.0 |
| 52 | 10 | 10 | 30 | 1.8 |
| 53 | 0 | 10 | 30 | 1.7 |

[a] P $C_3H_6$ = 15 psig [TIBA] = 0.5 mM [b] Cat 8 (M = Pd, R = Me, X = Br, An = O—$C_6H_4$Me.

EXAMPLE 54

Styrene was the monomer polymerized by a syndiospecific and a non-specific catalyst. A 250 mL crown-capped glass pressure reactor containing magnetic stirring bar was sealed under argon. Toluene (50 mL), styrene (5 mL), and MAO (0.2 M) were injected in that order and stirred for 10 min. $\eta^5$-Idenyltitanium trichloride (50 μM) and zirconocene dichloride (5 mM) were then injected; the polymerization mixture was stirred for 0.5 hour and quenched by addition of 150 mL of 10% HCL in methanol. After filtration, washing, and drying, 1.2 g of polymer was obtained. The polymer was extracted with refluxing pentane; the 15 wt % polymer in this fraction is atactic polystyrene. The 2-butanone soluble pentane insoluble fraction (12 wt %) contained a stereoblock copolymer. The remaining 2-butanone insoluble material of 73 wt % is the syndiotactic polystyrene.

EXAMPLE 55

An ethylene-selective catalyst (6) which does not incorporate α-olefin is used to polymerize ethylene to linear polyethylene. It is the zirconium complex with the following bridging ligand,

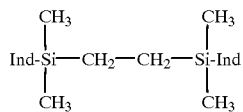

The second catalyst component is Cat 1 or any other bridged metallocene compound selected from the lists of sio-P and syn-P above, which copolymerizes ethylene and α-olefin efficiently. A 250 mL crown-capped glass pressure reactor with a magnetic stirring bar was first evacuated, flushed with argon, then charged with 50 mL crown-capped glass pressure reactor with a magnetic stirring bar was first evacuated, flushed with argon, then charged with 50 mL of toluene and 10 mL of hexene, the system was evacuated again and saturated with ethylene for ca. 20 min. to 15 psig. Tri-i-butyl aluminum (5 mM), Cat 6 (5 μM) and rag-dimethylsilylenebis (1-$\eta^5$4-idenyl) dichlorozirconium (Cat. 1,5 μM) were injected with syringe as toluene solution. The system was heated to 65° C., stirred for ca. 20 additional min. to saturated it with ethylene. Finally, a toluene solution of the cocatalyst (Cocat, 10 μM) was introduced to initiate the polymerization. Upon completion, the polymerization mixture was quenched with acidic methanol (containing 2% HCL), filtered, washed with methanol, and dried at 70° C. under vacuum yielding 0.55 g of flexomer. It has two $T_m$'s at 138° C. and 116° C. Compared with the ordinary linear low-density polyethylene synthesized using Cat. 1 alone, the flexomer of this invention has higher dart impact strength and tensile modulus.

EXAMPLE 56

Example 55 was repeated except that 1-butene was the comonmer rather than 1-hexene and that MAO was employed as the cocatalyst. The activity of polymerization was $6.8 \times 10^6$ g polymer/(mol Zr.hr).

What is claimed is:

1. A catalyst composition for the production of a compatible polyolefin blend comprising a homogeneous mixture of (a) a polymerization catalyst selected from the group consisting of syndiospecific propylene polymerization catalyst, a hemi-isospecific propylene polymerization catalyst and a nonspecific propylene polymerization catalyst, (b) a co-catalyst, and (c) a cross-over agent of concentration in the range from hundreds to thousands of times the concentration of said catalysts.

2. A catalyst composition for the production of a compatible polyolefin blend comprising a homogeneous mixture of (a) a polymerization catalyst selected from the group consisting of syndiospecific propylene polymerization catalyst, an isospecific propylene polymerization catalyst, and a nonspecific propylene polymerization catalyst, (b) a co-catalyst, and (c) a cross-over agent of concentration in the range from hundreds to thousands of times the concentration of said catalysts.

3. A catalyst composition for the production of a compatible polyolefin blend comprising a homogeneous mixture of (a) a polymerization catalyst selected from the group consisting of ethylene polymerization catalyst and a branching ethylene polymerization catalyst, (b) a co-catalyst, and (c) a cross over agent of concentration in the range from hundreds to thousands of times the concentration of said catalysts.

4. A catalyst composition for the production of a compatible polystyrene blend comprising a homogeneous mixture of (a) a polymerization catalyst selected from the group consisting of a syndiospecific styrene polymerization catalyst and a non-specific styrene polymerization catalyst, (b) a co-catalyst, and (c) a cross-over agent of concentration in the range from hundreds to thousands of times the concentration of said catalysts.

5. A catalyst composition in accordance with claims 1 to 4 wherein the cocatalyst is selected from the group consisting of triphenylcarbenium tetrakis (pentafluorophenyl), tris (pentafluorophenyl) borane, oxycarbyl aluminum compounds and methylaluminoxane oligomer.

6. A catalyst composition in accordance with claims 1 to 4 wherein the cross-over-agent is selected from the group consisting of hydrocarbylaluminum compound, trialkyl compound of aluminum, oxycarbyl aluminum compounds, and methylaluminoxane oligomer.

7. A catalyst composition in accordance with claim 6 wherein the concentration of the cross-over agent in the mixture is large by hundreds to thousands factor compared to that of the polymerization catalysts.

8. The catalyst composition claimed in claim 1 wherein the cross-over agent is selected from the group consisting of hydrocarbyls and oxyhydrocarbyls of Group III A metals.

9. The catalyst composition claimed in claim 2 wherein the cross-over agent is selected from the group consisting of hydrocarbyls and oxyhydrocarbyls of Group III A metals.

10. A catalyst composition for the production of a compatible polyolefin blend comprising a homogeneous mixture of (a) a polymerization catalyst selected from the group consisting of syndiospecific olefin polymerization catalyst, a hemi-isospecific olefin polymerization catalyst and a non-specific olefin polymerization catalyst, (b) a co-catalyst, and (c) a cross-over agent selected from the group consisting of hydrocarbyls and oxyhydrocarbyls of Group III A metals, and wherein the concentration of the cross-over agent is in the range from hundreds to thousands of times the concentration of said catalysts.

* * * * *